United States Patent [19]

Pamer

[11] 3,929,229

[45] Dec. 30, 1975

[54] ARTICLE STORAGE FACILITY

[75] Inventor: Karl A. Pamer, Chagrin Falls, Ohio

[73] Assignee: McNeil Corporation, Akron, Ohio

[22] Filed: Sept. 10, 1973

[21] Appl. No.: 395,619

[52] U.S. Cl. .............................. 211/134; 214/16.4 B
[51] Int. Cl.² ........................ A47F 5/00; B65G 1/06
[58] Field of Search... 214/16.4 A, 16.4 B, 16.1 CB, 214/16.1 CC; 211/134

[56] References Cited
UNITED STATES PATENTS

| | | | |
|---|---|---|---|
| 3,139,994 | 7/1964 | Chasar | 214/16.4 A |
| 3,485,390 | 12/1969 | Atwater | 214/16.4 B |
| 3,583,583 | 6/1971 | Martin | 214/16.4 B |

Primary Examiner—Robert J. Spar
Assistant Examiner—R. B. Johnson
Attorney, Agent, or Firm—Watts, Hoffmann, Fisher & Heinke Co.

[57] ABSTRACT

An article storage facility including structure providing a plurality of article holding compartments in vertical and horizontal rows along opposite sides of aisles and power-operated article handling apparatus, such as, a so-called "stacker crane" movable along the aisles or depositing and removing articles from the article holding or storing compartments. The article holding structure comprises a plurality of prefabricated, duplicate, rectangular structural steel picture frame-like members spaced one behind the other in rows thus forming the aisles and through which frames the material or article handling apparatus travels. The use of rectangular frames of the character mentioned to define or form the aisle facilitates erection of the article holding structure and assures that the aisles are of predetermined uniform width.

1 Claim, 1 Drawing Figure

ARTICLE STORAGE FACILITY

BACKGROUND OF THE INVENTION

1. Field of the Invention

The invention relates to article holding facilities including power-operated article handling apparatus for moving articles into and out of the article holding compartments along opposite sides of an aisle.

2. Description of the Prior Art

Article storage facilities including structure providing a plurality of article holding compartments in vertical and horizontal rows along opposite sides of aisles serviced by power-operated article handling apparatus movable along the aisles are known but the structure providing the article holding compartments is expensive to produce, expensive to erect and/or the aisles through which the article handling apparatus travels are of nonuniform width resulting in unsatisfactory operation of the facility.

SUMMARY OF THE INVENTION

The invention provides an article storage holding facility, for example, a warehouse, having a plurality of article holding compartments arranged in vertical and horizontal rows along opposite sides of aisles of predetermined uniform width into which articles can be placed and removed by power-operated article handling apparatus, preferably automatically controlled, and movable in predetermined paths along the aisles by providing vertically positioned, duplicate, rectangular picture frame-like members arranged one behind the other in side-by-side parallel rows with side-by-side picture framelike members in the same plane connected to one another by vertically spaced, generally horizontal load supporting members. The uniform width of the aisles enhances the operation and reliability of the entire facility. The uniform width of the aisles is accomplished by a plurality of rectangular frames or frame members prefabricated to uniform size located one behind the other and through which the article handling apparatus travels.

The invention further provides article holding, racklike structures of the character referred to which is inexpensive and can be readily produced from commercially available material.

Further objects and advantages of the invention will be hereinafter referred to and others will be apparent from the following detailed description of the preferred embodiment of the invention.

BRIEF DESCRIPTION OF THE DRAWING

The drawing is a fragmentary perspective view of a storage area embodying the invention.

DESCRIPTION OF THE PREFERRED EMBODIMENT

Figure 1:
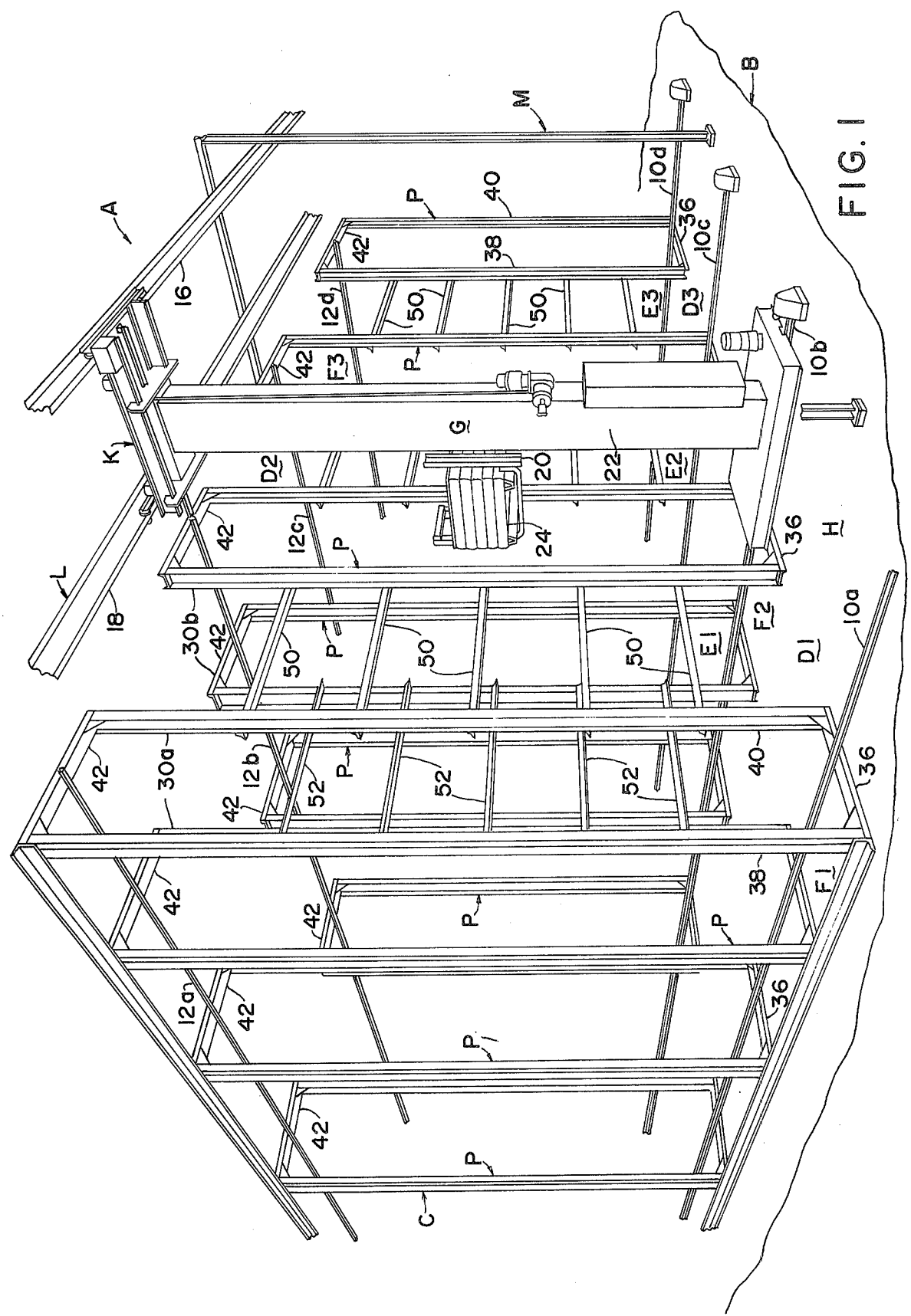

The article holding or storage facility may be a warehouse, etc. The facility illustrated in the drawing and designated generally by the reference character A, is located in a building, a fragmentary part of the floor of which is shown and designated B. The facility A comprises an article holding or storage structure designated generally by the reference character C providing a plurality of horizontally spaced rows D1, D2, etc. of article holding compartments E arranged in vertical and horizontal rows along one or both sides of aisles F1, F2, etc., and a so-called stacker crane G movable from aisle to aisle and in the respective aisles for selectively depositing articles in the article holding compartments and retrieving them, as desired.

The stacker crane G, shown, is of commercial construction, of the rail supported self-drive type supported and guided in its movement in the aisles F1, F2, by lower rails 10a, 10b, etc., and overhead rails 12a, 12b, etc., connected to the structure C, and is movable along an aisle H at the near end of aisles F1, F2, etc., from aisle to aisle of aisles F1, F2, etc., and/or to and from a loading and/or discharge station at one or both ends of the aisle H by an overhead bridge-type carrier K movable along an overhead runway L comprising rails 16, 18 suspended from the building superstructure M. For movement from one aisle to another and/or to and from an article loading and/or discharge station the crane G is moved underneath the overhead carrier K which includes mechanism for lifting the crane proper free of the lower rails to permit movement thereof by the carrier K along the aisle H at the near ends of the aisles F1, F2, etc. The crane G includes an L-shaped load carrier 20 vertically movable along the crane mast 22 which carrier is provided with a transversely movable load support 24 that can be extended into the article holding compartments E1, E2, etc. to place articles therein or remove articles therefrom.

The stacker crane G illustrated and the carrier K for moving it from aisle to aisle F1, F2, etc., and/or to a loading and/or discharge station is commercially available and is similar to that shown in U.S. Pat. No. 3,583,583 except that the crane G is rail supported rather than floor supported.

The structure C comprises a plurality of horizontally spaced rows 30a, 30b, etc., of duplicate picture framelike members P spaced one behind the other on the building floor B and form the aisles F1, F2, etc., in which the crane G is movable. The lower rails 10a, 10b, etc. rest upon the lower parts 36 of the members P and are fixed thereto midway between the side parts 38, 40 of the members P. The upper rails 12, 12b, etc. are connected to the undersides of the top parts 42 of the members P and are fixed thereto midway between the parts 38,40 of the members P.

In constructing the storage facility a plurality of members P are aligned in side-by-side, spaced, parallel rows and secured to one another as by the rails 10, 12 open side-by-side members P in the same plane are secured to one another by the members 50, 52 and other means if such are desired. The aisles thus formed and in which the article handling crane moves are of uniform width. Any variations between aisles will occur in the storage compartment and will not affect the reliability of the operation of the facility.

From the foregoing it will be apparent that objects and advantages of the present invention heretofore referred to and others have been accomplished and there has been provided an article storage structure providing a plurality of article holding compartments in vertical and horizontal rows along opposite sides of aisles of uniform width, which can be constructed and maintained at low cost, etc.

While a preferred embodiment of the invention is illustrated and described in considerable detail it is to be understood that the invention is not limited to the particular construction shown and it is the intention to hereby cover all modifications thereof within the scope of the appended claims.

What is claimed is:

1. An article storage facility comprising: at least two horizontally spaced parallel rows of vertically positioned, parallel, duplicate, rectangular picture frame-like members spaced one behind the other; each said row of picture frame-like members forming an aisle for the movement of a power-operated article handling apparatus therein; a plurality of vertically spaced article supports spanning the space between said parallel rows of picture frame-like members comprising generally horizontal members connected at one end to vertical sides of said picture frame-like members of one row of picture frame-like members and at their other ends to adjacent vertical sides of picture frame-like members of a second row of picture frame-like members adjacent to said first row of picture frame-like members and which picture frame-like members are in the same vertical plane as the plane of the picture frame-like member of said one row of adjacent picture frame-like members to which the generally horizontal members are connected; and rail members in said aisle of each row rows of picture frame-like members connected to top and/or the bottom sides thereof for supporting a power-operated article handling apparatus therein.

* * * * *

UNITED STATES PATENT AND TRADEMARK OFFICE
CERTIFICATE OF CORRECTION

PATENT NO. : 3,929,229
DATED : December 30, 1975
INVENTOR(S) : Karl A. Pamer

It is certified that error appears in the above-identified patent and that said Letters Patent are hereby corrected as shown below:

Claim 1 (column 4, line 9) delete "rows"

Signed and Sealed this thirtieth Day of March 1976

[SEAL]

Attest:

RUTH C. MASON
*Attesting Officer*

C. MARSHALL DANN
*Commissioner of Patents and Trademarks*